Sept. 23, 1952          E. F. JIRSA          2,611,671

FLUID SEAL ASSEMBLY

Filed April 5, 1951          3 Sheets-Sheet 1

INVENTOR.
EMIL F. JIRSA
BY
ATTORNEYS

Sept. 23, 1952  E. F. JIRSA  2,611,671
FLUID SEAL ASSEMBLY

Filed April 5, 1951  3 Sheets-Sheet 2

INVENTOR.
EMIL F. JIRSA
BY
ATTORNEYS

Sept. 23, 1952  E. F. JIRSA  2,611,671
FLUID SEAL ASSEMBLY

Filed April 5, 1951  3 Sheets-Sheet 3

INVENTOR.
EMIL F. JIRSA
BY
ATTORNEYS

Patented Sept. 23, 1952

2,611,671

UNITED STATES PATENT OFFICE 2,611,671

FLUID SEAL ASSEMBLY

Emil F. Jirsa, Waterloo, Iowa, assignor to Deere Manufacturing Co., Dubuque, Iowa, a corporation of Iowa Application April 5, 1951, Serial No. 219,477

9 Claims. (Cl. 309—23)

This invention relates to a fluid seal assembly and more particularly to a seal assembly in which special provision is made for the assembling of sealing components on a member, such as a piston or shaft, carried by a fixed part for relative movement.

The invention is designed primarily to improve the character of seals between the piston and cylinder of a fluid motor. In a typical prior art construction, the outer cylindrical surface of the piston is interrupted by an annular groove in which is contained a suitable sealing ring. One particular form of ring is the so-called O-ring, which is an elastic ring of rubber or rubber composition. Highly satisfactory results have been obtained with O-rings but considerable difficulty has been experienced because of the tendency of the fluid pressure to cause the O-ring to extrude into the clearance space between the outer cylindrical surface of the piston and the cooperative inner cylindrical surface of the cylinder.

This difficulty has been in part corrected by the use of what are called backing washers. These washers may be used singly or in pairs and are constructed of material substantially harder than the rubber of which the O-ring is composed. The backing ring is slightly oversize and serves the function of blocking the clearance space so that the material of the O-ring cannot be extruded into this space.

Backing rings are of several types and may be made of various types of material. In the case of a one-piece piston, installation of the O-ring presents no problem, because the O-ring, being elastic, can be stretched over the end of the piston so that it will snap into the O-ring groove. If the material of which the backing washer is made is non-stretchable, it has heretofore been impossible to install this ring without either splitting the ring or providing a removable end on the piston. According to the present invention, these difficulties have been eliminated and the use of an endless non-stretchable backing ring or washer is made possible.

The principal object of the invention is to provide a member, such as a piston or equivalent member to be carried for movement relative to a fixed part, with an annular groove for carrying the conventional O-ring. In its broadest aspects, the invention contemplates the reduction of the circumference of the bottom of the O-ring groove by the provision of a recess that is materially thinner in an axial direction than the axial width of the O-ring groove. The thickness or width of the recess is only enough to accommodate the relatively thin backing washer, which may be hooped over a segment of the end of the piston and received into the recess to such extent that the washer or ring may be deformed to various oval shapes to facilitate the slipping of the ring or washer over the end face of the piston, subsequent to which this ring or washer may be seated on the annular shoulder or bottom of the O-ring groove. Following this, the O-ring can be easily slipped over the end face of the piston and into place to encircle the bottom of the groove. Since the O-ring, by its very nature, is large enough to fill or substantially fill the O-ring groove, except for the backing ring and a tolerable clearance, the O-ring serves as means to prevent the backing ring from reentering the installation recess. In one form of the invention, the installation recess takes the form of an annular groove having a diameter less than the diameter of the bottom of the O-ring groove by a relatively small fraction. In another form of the invention, the recess takes the form of a slit that cuts a chord across the circle of the O-ring groove. In both cases, the reduction in circumference afforded by the recess is sufficient to accommodate enough of the hooped ring so that the remainder of the ring may be easily "ovalized" to slip over the end face of the piston. It is a further object of the invention to provide a piston or equivalent member, having the above characteristics, on which conventional endless backing rings may be installed.

The foregoing and other important objects and desirable features inherent in and encompassed by the invention will become apparent as a complete disclosure of two preferred forms thereof is made in the following detailed description and accompanying sheets of drawings in which Figure 1 is a longitudinal sectional view through a portion of a fluid motor including a reciprocating piston and a cylinder;

Figure 1:
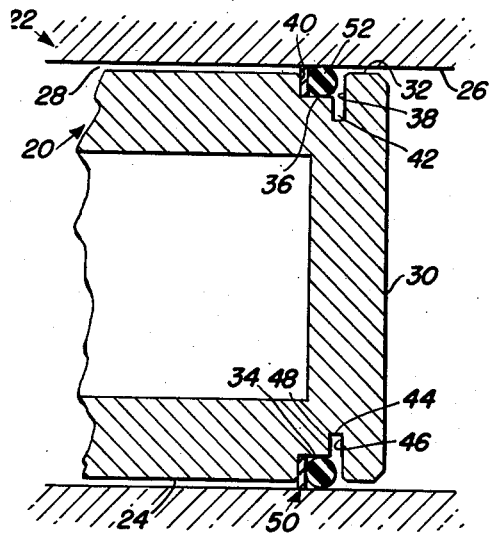
Figure 2:
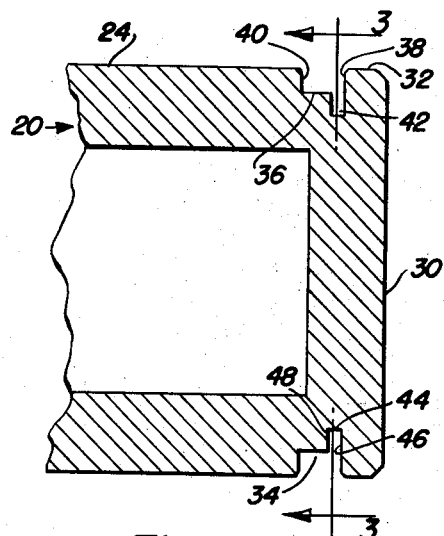
Figure 2 is a sectional view of the piston by itself.
Figure 3:
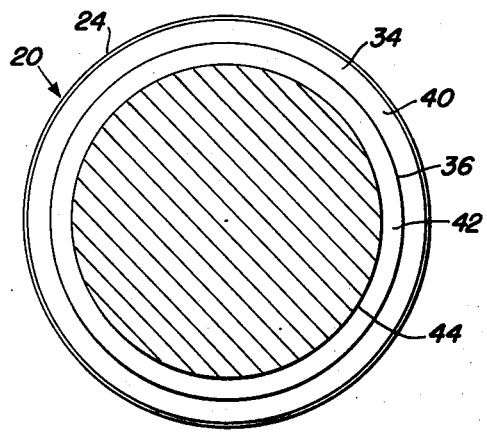
Figure 3 is a transverse sectional view taken on the line 3—3 of Figure 2.
Figure 8:
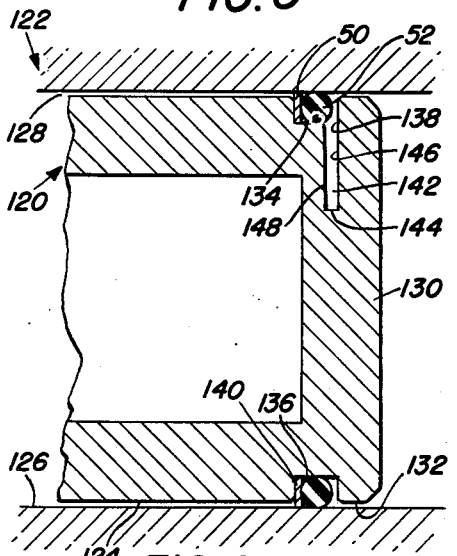
Figure 9:
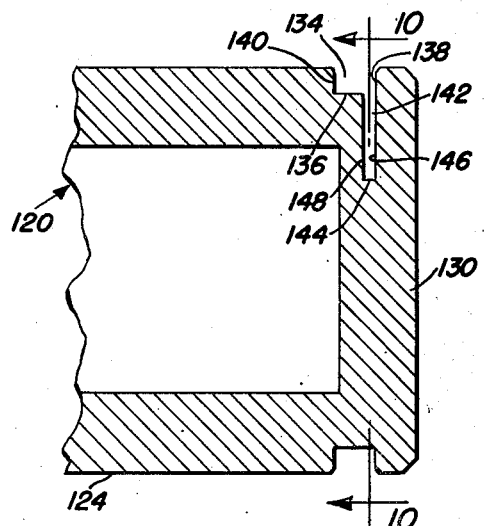
Figure 10:
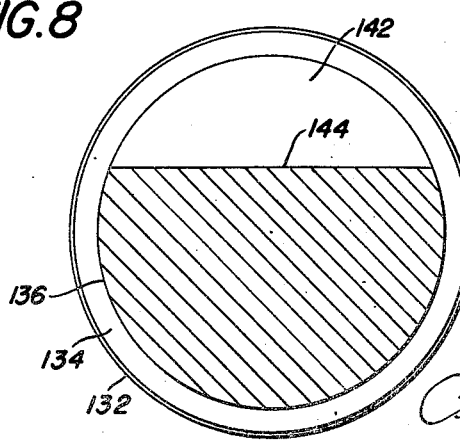
Figure 11:
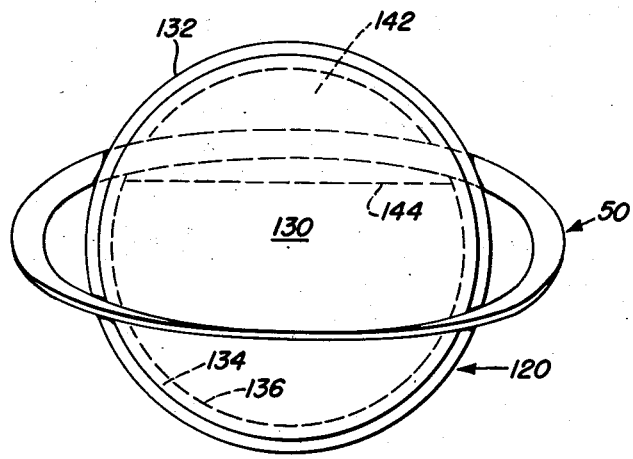
Figure 12:
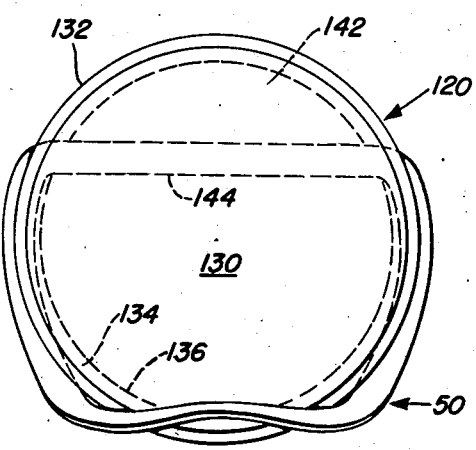

Figures 8, 9 and 10 correspond respectively with Figures 1, 2 and 3 but illustrate a second form of the invention; and Figures 11 and 12 are face views of the modified form of piston and show successive steps in the installation of the backing ring thereon.

As stated above, the invention is applicable to either pistons or rotating parts. However, the present disclosure lends itself better to the description of both forms of the invention in terms of a piston and cylinder. It will be understood, of course, that the invention is not to be limited by such description. Likewise, the use of such expressions as "front" and "rear" etc., are relative only and are not intended to indicate that the invention cannot take forms other than those disclosed.

In Figure 1, a movable member in the form of a piston 20 is shown as being carried by a fixed part in the form of a cylinder 22. The piston has an outer cylindrical surface 24 which fits tolerably within and cooperates with an inner cylindrical surface 26 of the cylinder 22. The expression "tolerably" is used to define a relationship between parts in which operating clearances exist. Such clearance between the piston surface 24 and the cylinder surface 26 is shown at 28.

The piston has a circular front end face 30 having an outside diameter equal to the outside diameter of the outer cylindrical surface 24 of the piston. A portion of this outer cylindrical surface, as at 32, extends concentrically and axially back from the end face 30 an axial distance that is only a relatively small fraction of the outside diameter of the end face 30. In a preferred embodiment of the invention, certain dimensions are found to give satisfactory results. These dimensions will be here, as elsewhere herein, expressed in terms of inches.

The outside diameter of the circular end face 30, and likewise the outside diameter of the cylindrical surface portion 32, may be 3.11. The relatively small fraction of the diameter of the circular face 30 through which the cylindrical outer surface 32 extends before it is interrupted by an annular groove 34 is about .3125.

The groove 34 is defined by an annular bottom 36 and first and second annular radial walls 38 and 40. The first radial wall 38 adjoins the outer cylindrical surface 32 and is accordingly spaced from the end face 30 by the dimension .3125. The other radial wall 40 is more remotely axially spaced from the end face 30, such that the axial dimension or spacing between the radial walls is on the order of .34375. The depth of the groove is such that the diameter of the circular or annular bottom 36 is 2.746, leaving the depth a relatively small fraction of the outside diameter of the piston. In this case, the depth would be on the order of .182.

Figure 4:
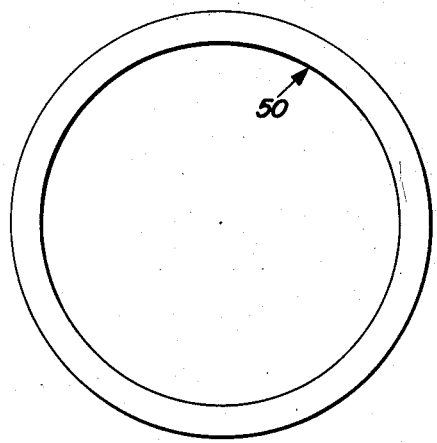
Figure 4 is a view of the backing ring by itself.

The piston is further provided with a recess, designated generally by the numeral 42, which here takes the form of an annular groove having a circular bottom 44 and first and second, axially spaced apart annular radial walls 46 and 48. In the illustration shown here, the radial wall 48 is a radially inward continuation of the first radial wall 38 of the groove 34, which results because the recess or groove 42 is closely adjacent the radial wall 38. The axial spacing between the radial walls 46 and 48 of the groove 42 (hereinafter referred to as the "installation" groove) is here on the order of .09375. The depth of the groove or recess 42 is but a relatively small fraction of the outside diameter of the circular face 30, here on the order of .1855, which means that the diameter of the bottom 44 of the installation groove is on the order of 2.375. Because of the relative widths of the grooves 42 and 34, the former is materially less than the latter and is of sufficient width only to accommodate the axial thickness of an endless, non-stretchable backing ring 50, shown by itself in Figure 4.

This ring, when installed to encircle the bottom 36 of the groove 34, seats, with appropriate clearance, on the bottom 36 of the groove 34. Therefore, the inside diameter of the ring 50 is on the order of 2.7815, or only tolerably greater than the 2.746 dimension which represents the diameter of the circle forming the bottom 36 of the groove 34. In the present case, the outside diameter of the ring 50 is 3.125, which slightly exceeds the 3.11 diameter of the circular end face 30. The axial dimension or thickness of the ring 50 is .0625, which is sufficiently smaller than the .09375 dimension between the radial walls 46 and 48 to allow portions of the ring 50 to be received in the installation groove 44 in a manner that will be described below.

As stated above, the ring 50 is non-stretchable; although, it may be deformed or "ovalized" to assume various oval or partly oval shapes, the purpose of which will appear later. The preferred ring or washer 50 is of treated paper, such as that commercially sold under the trade names "Victorite" or "Vellumoid." Other materials having similar characteristics may, of course, be utilized.

Because of the non-stretchable, although deformable, nature of the ring, and because of its dimensions relative to those of the piston, it will be seen that without the installation groove 42 it would be impossible to install the endless ring 50 over the end face 30 and outer surface 32 of the piston. However, because of the installation groove, the assembly can be accomplished, thus making possible the use of a one-piece piston. In this respect, the expression "one-piece" is used to include pistons in which the end face is an integral or normally non-removable component of the piston, as distinguished from a structure in which the end of the piston can be removed to permit the installation of a ring in manners other than those here disclosed or their equivalents.

Passing by for the moment the method or manner of installing the ring 50 on the piston 20, note should be taken of the ability of the groove 34 to contain the ring 50 plus a sealing ring 52, here shown as an endless, elastic O-ring, which may be of conventional design and composed of the usual materials used in rings of this type. The backing ring or washer 50 lies flat against the remote radial wall 40 and the O-ring 52 is between the opposite radial face of the backing ring 50 and the proximate or first radial face 38 of the groove 34. The O-ring, being elastic, is easily stretched over the end face 30 so as to snap into the groove 34. Since the outside dimension or diameter of the backing ring 50 is greater than the outside diameter of the piston, the backing ring will close the clearance space 28, and will thus prevent extrusion of the O-ring 52 to the left (as viewed in the drawings) into such clearance space. The O-ring has an axial dimension sufficiently greater than the axial width of the installation groove or recess 42 so that, when the two rings are installed, the O-ring blocks the installation groove and prevents accidental return of the backing ring 50 into the installation groove.

Figure 5:
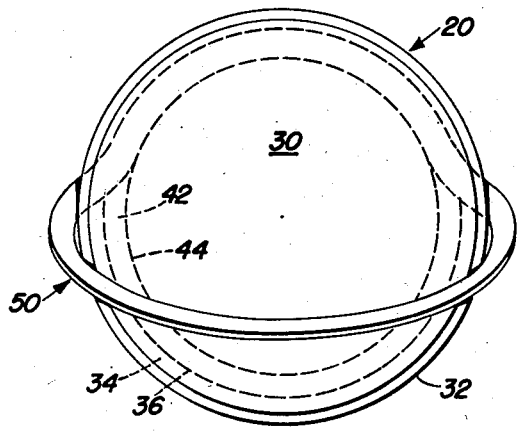
Figures 5, 6 and 7 are face views of the piston and backing ring, showing successive steps in the installation of the ring.
Figure 6:
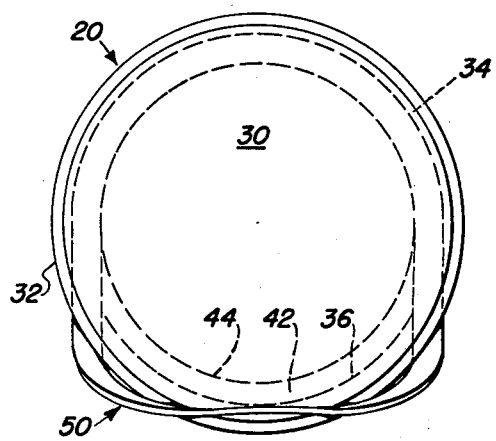
Figure 7:
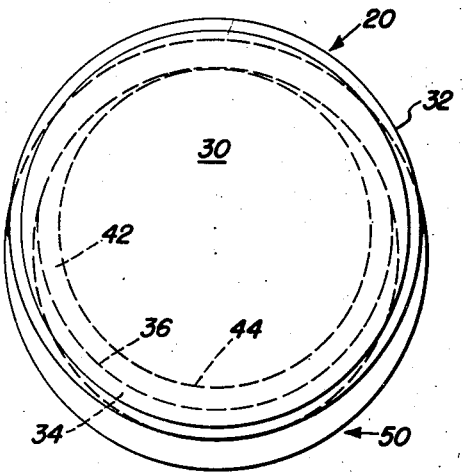

The manner of installing the ring 50 over the end face 30 of the piston is illustrated in Figures 5 and 6. The first step in the installation comprises hooping a portion of the ring 50 over a segment of the end face 30, so that the hooped portion of the ring can be pressed down into the installation groove. The ring is deformable to the shape illustrated in Figure 5 and thus becomes "ovalized" to the extent that its major diameter exceeds the outside diameter of the end face 30. At the same time, additional portions of the ring 50 may be pressed into the installation groove, whereupon the deformed shape of the ring 50 becomes somewhat like that illustrated in Figure 6. Because the depth of the installation groove is on the order of that illustrated, the distance from the bottom of the groove to a diametrical point at the end face 30 will be approximately the same as the inside diameter of the ring 50. In the present case, the diametrical dimension referred to is 2.78125, which here turns out to be equal to the inside diameter of the ring 50. However, as the ring is continued into the installation groove, it elongates in the opposite direction, or in a direction transverse to the major diameter of the oval ring in Figure 5, so that the new major diameter becomes greater than the diameter of the end face 30, with the result that the penultimate position of Figure 7 is achieved. From here it is a simple matter to arrange the ring 50 concentrically with the groove 34 so that it may be tolerably seated on the annular bottom 36 of the groove 34. After that, the O-ring may be easily installed. Removal will follow the reverse of the procedure outlined above.

In the second form of the invention, substantially the same principles are utilized. For the purposes of correlating the two forms of the invention, the reference numerals used in the description of Figures 1 through 7 will be prefixed by the numeral "1" and used in the description of Figures 8 through 12, with the exception that the numerals 50 and 52 will be used for the backing and O-rings, since the rings may be the same in both cases.

In view of the foregoing explanation, it is deemed unnecessary to specifically describe the various parts of the piston 120, with the exception of some elaboration on the installation recess 142 which, in this form of the invention, is a slit cut across a chord of the circle forming the bottom 136 of the main groove 134. This chord is represented by the numeral 144 and is best shown in Figures 8, 9 and 10.

As in the form of the invention described above, the main function of the installation groove or slit 142 is to cause a reduction in the circumference of the bottom 136 of the groove 134, so that a portion of the backing ring 50 may be hooped over a segment of the end face 130 so as to be received in the installation slit, with the result following as illustrated in Figures 11 and 12. The depth of the installation slit is shown as .6875. Here again, the installation slit permits initial acceptance of part of the ring 50 so that other parts thereof may be deformed so as ultimately to slip over the end face 130, after which the ring may be circularized and seated on the bottom 136 of the groove 134. The O-ring 52 is installed as above and again functions to prevent the ring 50 from returning to the installation slit 142.

On the basis of the foregoing disclosure, the fundamental principles of the invention will be readily understood. Various specific features other than those enumerated will undoubtedly occur to those skilled in the art, as likewise will numerous modifications and alterations in the preferred forms of the invention illustrated, all of which may be achieved without departing from the spirit and scope of the invention as defined in the appended claims.

What is claimed is:

1. A fluid seal assembly, comprising: a member adapted to be carried for movement relative to a fixed part having an inner cylindrical surface, said member having a circular end face and an outer cylindrical surface for tolerably fitting the inner cylindrical surface of the fixed part and concentric with and extending axially back from said end face, said outer surface and said end face having like diameters; said member having therein an annular groove including a bottom and first and second annular radial walls, said first radial wall adjoining said outer surface of the member and being spaced back from the end face an axial distance only a relatively small fraction of the diameter of said end face, and said second radial wall being spaced axially more remotely from said end face; an endless, non-stretchable ring adapted to be installed in the groove and having an axial thickness materially less than the axial spacing between said radial walls so as to be axially shiftable between said walls when installed in the groove, said ring being of distortable material so as to be capable of deformation to oval shape and having an inside diameter tolerably equal to the diameter of the bottom of the groove and less than the diameter of the end face by an amount sufficient to preclude installation of said ring over said end face even when partly received in the groove and deformed to oval shape; and said member having a radially inwardly directed recess communicating with the bottom of the groove adjacent the first radial wall and of axial width but slightly greater than the axial thickness of the ring so that the ring can be hooped over a segment of the end face and into said recess, said recess being of sufficient depth to accommodate the hooped portion of the ring to such an extent that by deformation of the ring to oval form it may be slipped over said end face and subsequently seated on the bottom of the groove.

2. The invention defined in claim 1, further characterized in that: the assembly includes an elastic stretchable ring and said elastic ring is stretched over the end face of the member to lie within the groove for preventing the seated installed non-stretchable ring from reentering the recess.

3. The invention defined in claim 1, further characterized in that: the recess is in the form of a second annular groove having a bottom of smaller diameter than the bottom of the first groove.

4. The invention defined in claim 1, further characterized in that: the recess is in the form of a slit cutting across a chord of the bottom of the groove.

5. The invention defined in claim 1, further characterized in that: the assembly includes an elastic seal ring stretchable over the end face of the member to lie in and to tightly encircle the bottom of the groove in the space between the first radial wall of the groove and the proximate radial face of the non-stretchable ring, said elastic ring having an axial thickness greater than that of the non-stretchable ring and normally precluded because of such thickness from entering the recess.

6. The invention defined in claim 1, further characterized in that: the non-stretchable ring has an outside diameter slightly greater than the diameter of said end face.

7. A fluid seal assembly, comprising: a member adapted to be carried for movement relative to a fixed part having an inner cylindrical surface, said member having a circular end face and an outer cylindrical surface for tolerably fitting the inner cylindrical surface of the fixed part and concentric with and extending axially back from said end face, said outer surface and said end face having like diameters; said member having therein an annular groove including a bottom and first and second annular radial walls, said first radial wall adjoining said outer surface of the member and being spaced back from the end face an axial distance only a relatively small fraction of the diameter of said end face, and said second radial wall being spaced axially more remotely from said end face; and said member having a radially inwardly directed recess communicating with the bottom of the groove adjacent the first radial wall and having an axial thickness materially less than the axial distance between said radial walls, said recess having such depth below that of the groove so as to materially reduce the circumference of the bottom of the groove adjacent said first radial wall and adapted to receive therein a segmental portion of a non-stretchable but deformable endless ring having an inside diameter less than the outside diameter of the end face so that the recess enables installation of such ring over said end face.

8. The invention defined in claim 7, further characterized in that: the recess is in the form of a second annular groove having a bottom of smaller diameter than the bottom of the first groove.

9. The invention defined in claim 7, further characterized in that: the recess is in the form of a slit cutting across a chord of the bottom of the groove.

EMIL F. JIRSA.

No references cited.